United States Patent
Wu et al.

(10) Patent No.: US 11,778,642 B2
(45) Date of Patent: Oct. 3, 2023

(54) FACILITATING DEVICE-TO-DEVICE COMMUNICATIONS

(71) Applicant: QUALCOMM Incorporated, San Diego, CA (US)

(72) Inventors: Shuanshuan Wu, San Diego, CA (US); Anantharaman Balasubramanian, San Diego, CA (US); Kapil Gulati, Belle Mead, NJ (US); Shailesh Patil, San Diego, CA (US); Sudhir Kumar Baghel, Hillsborough, NJ (US); Gabi Sarkis, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 17/127,912

(22) Filed: Dec. 18, 2020

(65) Prior Publication Data

US 2021/0195577 A1    Jun. 24, 2021

Related U.S. Application Data

(60) Provisional application No. 62/951,885, filed on Dec. 20, 2019.

(51) Int. Cl.
*H04W 72/51* (2023.01)
*H04W 76/14* (2018.01)
(Continued)

(52) U.S. Cl.
CPC ....... *H04W 72/51* (2023.01); *H04W 52/0216* (2013.01); *H04W 52/0219* (2013.01); *H04W 76/14* (2018.02); *H04W 4/40* (2018.02)

(58) Field of Classification Search
CPC ... H04W 4/40–48; H04W 8/22; H04W 72/02; H04W 72/048; H04W 72/1278;
(Continued)

(56) References Cited

U.S. PATENT DOCUMENTS 11,160,053 B2 * 10/2021 Kim ..................... H04L 5/0091
2016/0295624 A1   10/2016 Novlan et al.
(Continued)

FOREIGN PATENT DOCUMENTS

WO    WO-2018231748 A1 * 12/2018 ............. H04W 4/40
WO       2019036578 A1    2/2019
(Continued)

OTHER PUBLICATIONS

Intel Corporation, "Sidelink Resource Allocation Schemes for NR V2X Communication, 3GPP TSG RAN WG1 Ad-Hoc Meeting 1901, R1-1900483;" 3GPP, Taipei, Taiwan, uploaded Jan. 12, 2019, retrieved from https://www.3gpp.org/ftp/TSG_RAN/WG1_RL1/TSGR1_AH/NR_AH_1901/Docs/, pp. 1-22 (Year: 2019).*
(Continued)

*Primary Examiner* — Thomas R Cairns
(74) *Attorney, Agent, or Firm* — Loza & Loza, LLP

(57) ABSTRACT

Wireless communication devices are adapted to facilitate power conservation and sidelink communications. According to one example, a wireless communication device can transmit a reservation signal to reserve one or more sidelink resources for use by another device, and receive a sidelink transmission from the other device on at least a portion of the one or more reserved sidelink resources. According to another example, a wireless communication device can detect a reservation signal from another device, where the reservation signal is configured to reserve one or more sidelink resources, and transmit a sidelink transmission on at least a portion of the one or more of the sidelink resources (Continued)

reserved by the other device. Other aspects, embodiments, and features are also included.

8 Claims, 10 Drawing Sheets

(51) Int. Cl.
    *H04W 52/02*     (2009.01)
    *H04W 4/40*     (2018.01)

(58) Field of Classification Search
    CPC ..... H04W 76/14; H04W 84/18; H04W 92/18; H04W 8/005; H04W 72/12; H04W 72/20; H04W 72/25; H04W 72/27; H04W 72/29; H04W 72/40; H04W 72/51; H04W 72/512; H04W 88/04; H04W 8/20; H04W 36/0072; H04W 52/0216; H04W 52/0219; Y02D 30/70

See application file for complete search history.

(56) References Cited

U.S. PATENT DOCUMENTS

| | | | | |
|---|---|---|---|---|
| 2019/0124669 A1* | 4/2019 | Luo | .......... | H04W 4/44 |
| 2020/0374859 A1* | 11/2020 | Han | .......... | H04W 72/042 |
| 2021/0014791 A1* | 1/2021 | Freda | .......... | H04L 5/0053 |
| 2021/0392707 A1* | 12/2021 | Do | .......... | H04W 76/14 |

FOREIGN PATENT DOCUMENTS

| | | | | |
|---|---|---|---|---|
| WO | WO-2019050358 A1 * | 3/2019 | .......... | H04W 4/40 |
| WO | 2019148376 A1 | 8/2019 | | |
| WO | 2019195138 A1 | 10/2019 | | |

OTHER PUBLICATIONS

International Search Report and Written Opinion—PCT/US2020/066271—ISA/EPO—dated Mar. 31, 2021.

\* cited by examiner

FACILITATING DEVICE-TO-DEVICE COMMUNICATIONS

PRIORITY CLAIM

This application claims priority to and the benefit of provisional patent application No. 62/951,885 filed in the U.S. Patent and Trademark Office on Dec. 20, 2019, the entire content of which is incorporated herein by reference as if fully set forth below in its entirety and for all applicable purposes.

TECHNICAL FIELD

The technology discussed below relates generally to wireless communication systems, and more particularly, to facilitating device-to-device communications.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

Fifth generation (5G) New Radio (NR) networks may exhibit a higher degree of flexibility and scalability than fourth generation (4G) Long Term Evolution (LTE) networks, and are envisioned to support very diverse sets of requirements. Techniques applicable in such 5G NR networks for reducing power consumption and improving battery life, as well as facilitating device-to-device communications may be desirable.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various examples and implementations of the present disclosure facilitate device-to-device communications as well as reduced power consumption in wireless communication devices operating in wireless communications systems. In at least one aspect of the present disclosure, wireless communication devices are provided. In at least one example, a wireless communication device may include a transceiver and a processing circuit coupled to the transceiver. The processing circuit may be configured to transmit via the transceiver a reservation signal to reserve one or more sidelink resources for use by another device, and receive via the transceiver a sidelink transmission from the other device on at least a portion of the one or more reserved sidelink resources.

In at least one example, a wireless communication device may include a transceiver and a processing circuit coupled to the transceiver. The processing circuit may be configured to detect via the transceiver a reservation signal from another device, wherein the reservation signal is configured to reserve one or more sidelink resources, and transmit via the transceiver a sidelink transmission on at least a portion of the one or more of the sidelink resources reserved by the other device.

Further aspects provide methods of wireless communication and/or apparatus for wireless communication including means to perform such methods. One or more examples of such methods may include transmitting a reservation signal to reserve one or more sidelink resources for use by another device, and receiving a sidelink transmission from the other device on at least a portion of the one or more reserved sidelink resources.

One or more further examples of such methods may include detecting a reservation signal from another device, wherein the reservation signal is configured to reserve one or more sidelink resources, and transmitting a sidelink transmission on the one or more of the sidelink resources reserved by the other device.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
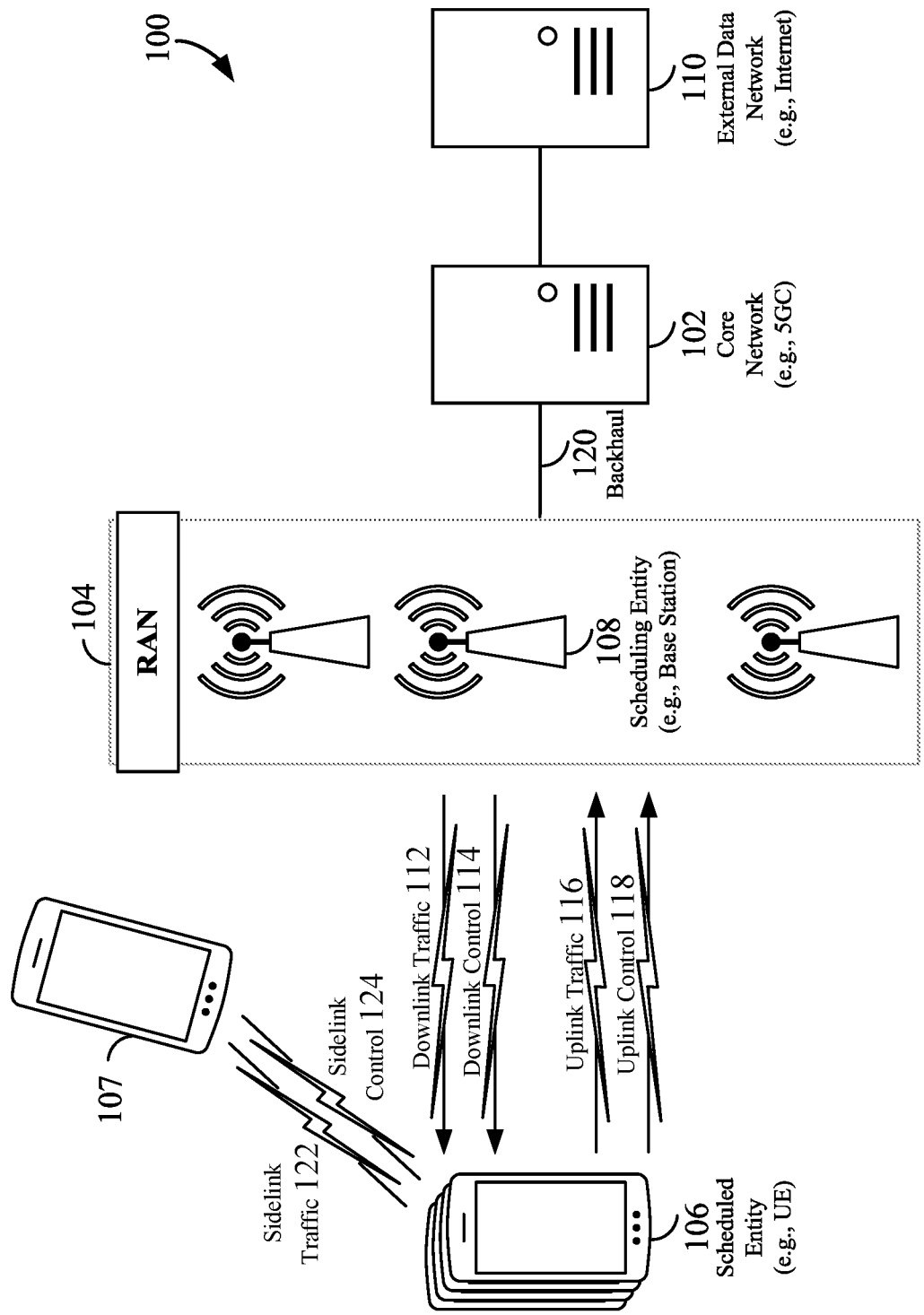
FIG. 1 is a schematic diagram illustrating an example of a wireless communication system according to one or more embodiments.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In some examples, scheduled entities such as a first scheduled entity 106 and a second scheduled entity 107 may utilize sidelink signals for direct device-to-device (D2D) communication. Sidelink signals may include sidelink traffic 122 and sidelink control 124. Sidelink control information 124 may in some examples include a request signal, such as a request-to-send (RTS), a source transmit signal (STS), and/or a direction selection signal (DSS). The request signal may provide for a scheduled entity 106 to request a duration of time to keep a sidelink channel available for a sidelink signal. Sidelink control information 124 may further include a response signal, such as a clear-to-send (CTS) and/or a destination receive signal (DRS). The response signal may provide for the scheduled entity 106 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 122.

Figure 2:
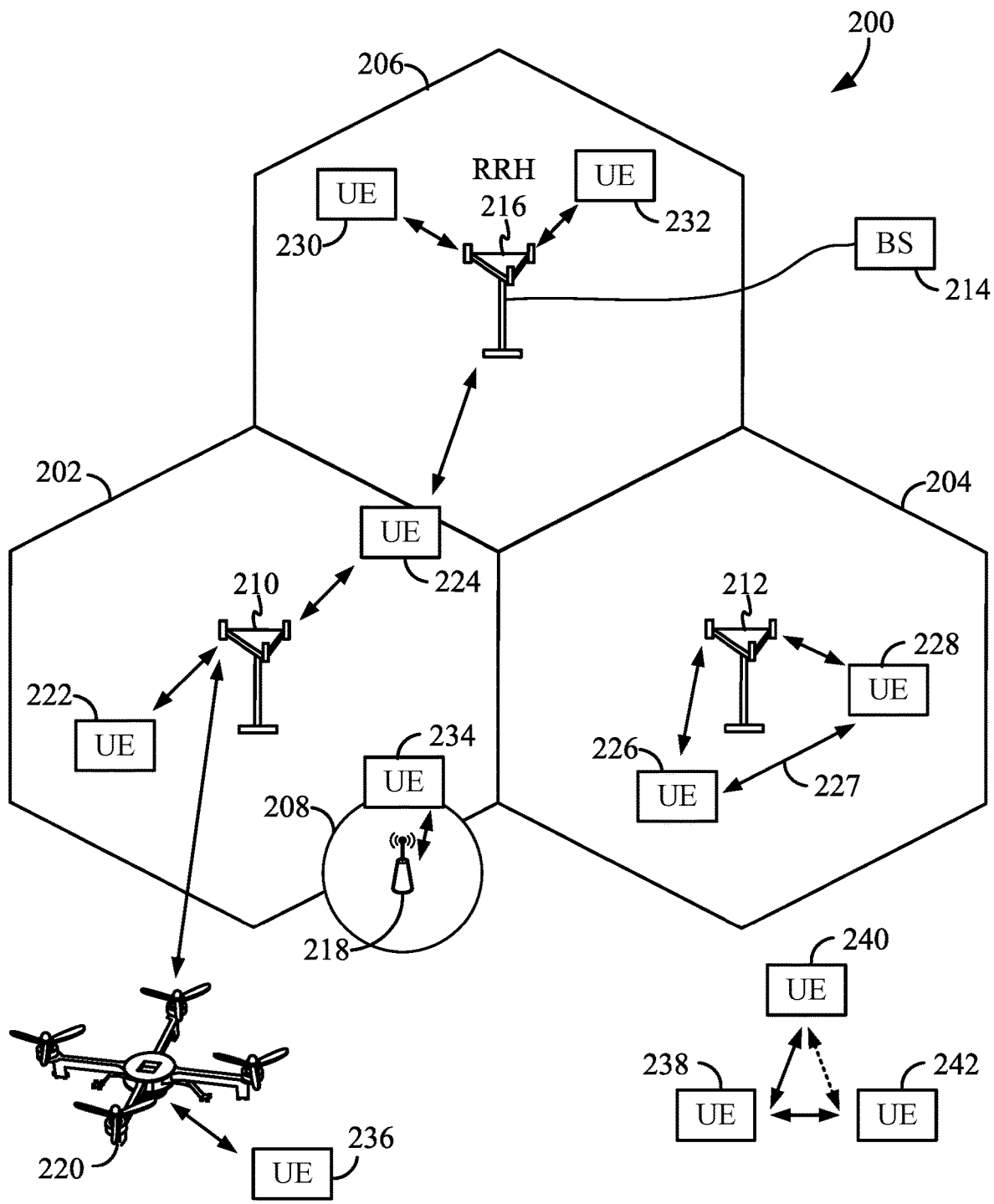
FIG. 2 is a conceptual diagram illustrating an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, as noted with reference to FIG. 1 above, sidelink signals may be used between UEs without necessarily relying on communications with a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a D2D, peer-to-peer (P2P), or vehicle-to-vehicle (V2V) network, a vehicle-to-everything (V2X), a mesh network, or other suitable direct link network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P/D2D configuration, or a mesh configuration, a scheduling entity and one or more scheduled entities may communicate utilizing the scheduled resources.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 3:
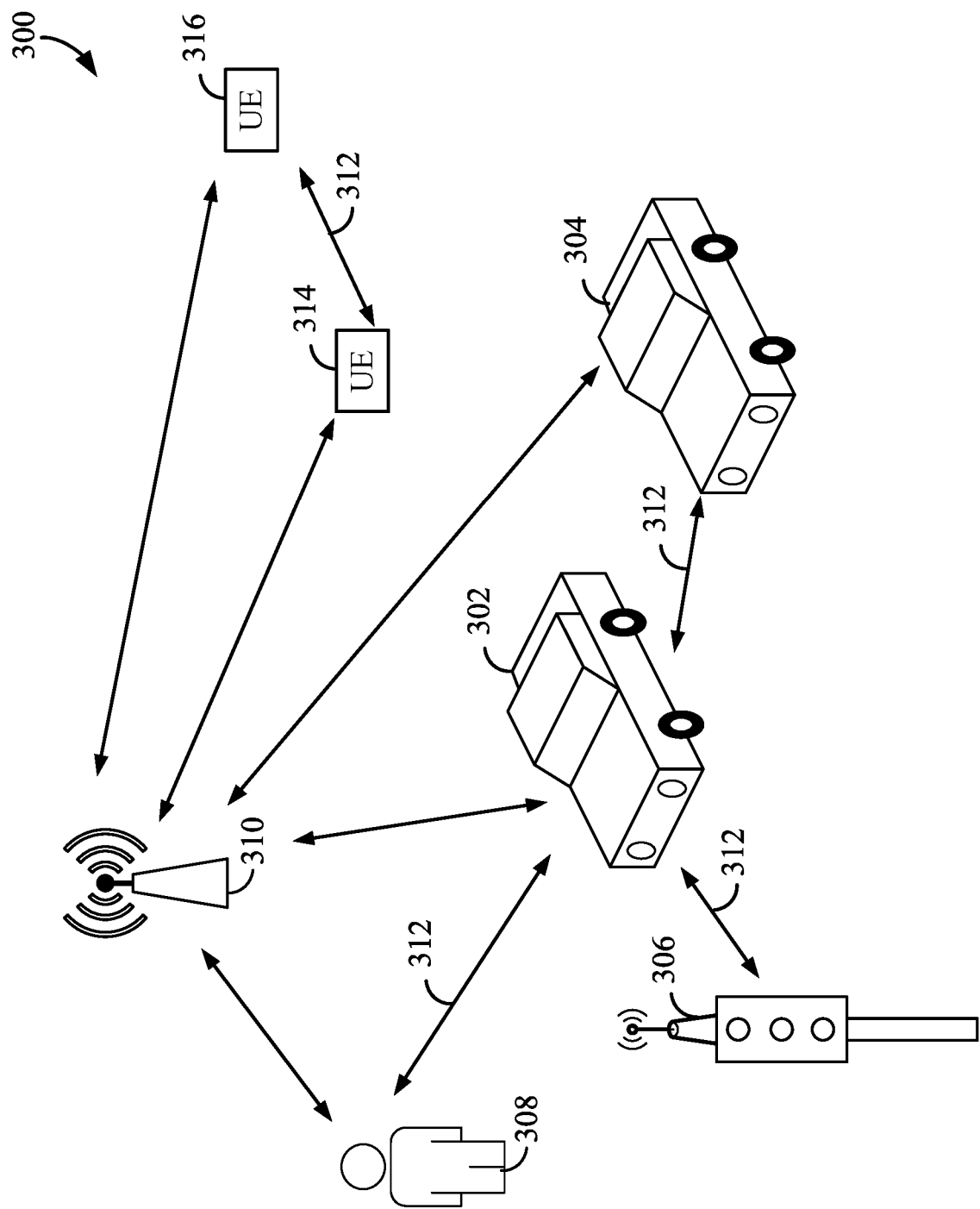
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 3206 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases. Examples of other proximity use cases may include public safety or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., V-UEs 302 and 304 and P-UE 3208) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., UEs 314 and 316) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 312 is the same between the two modes. Therefore, from a receiver's point of view, there is no difference between the modes.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
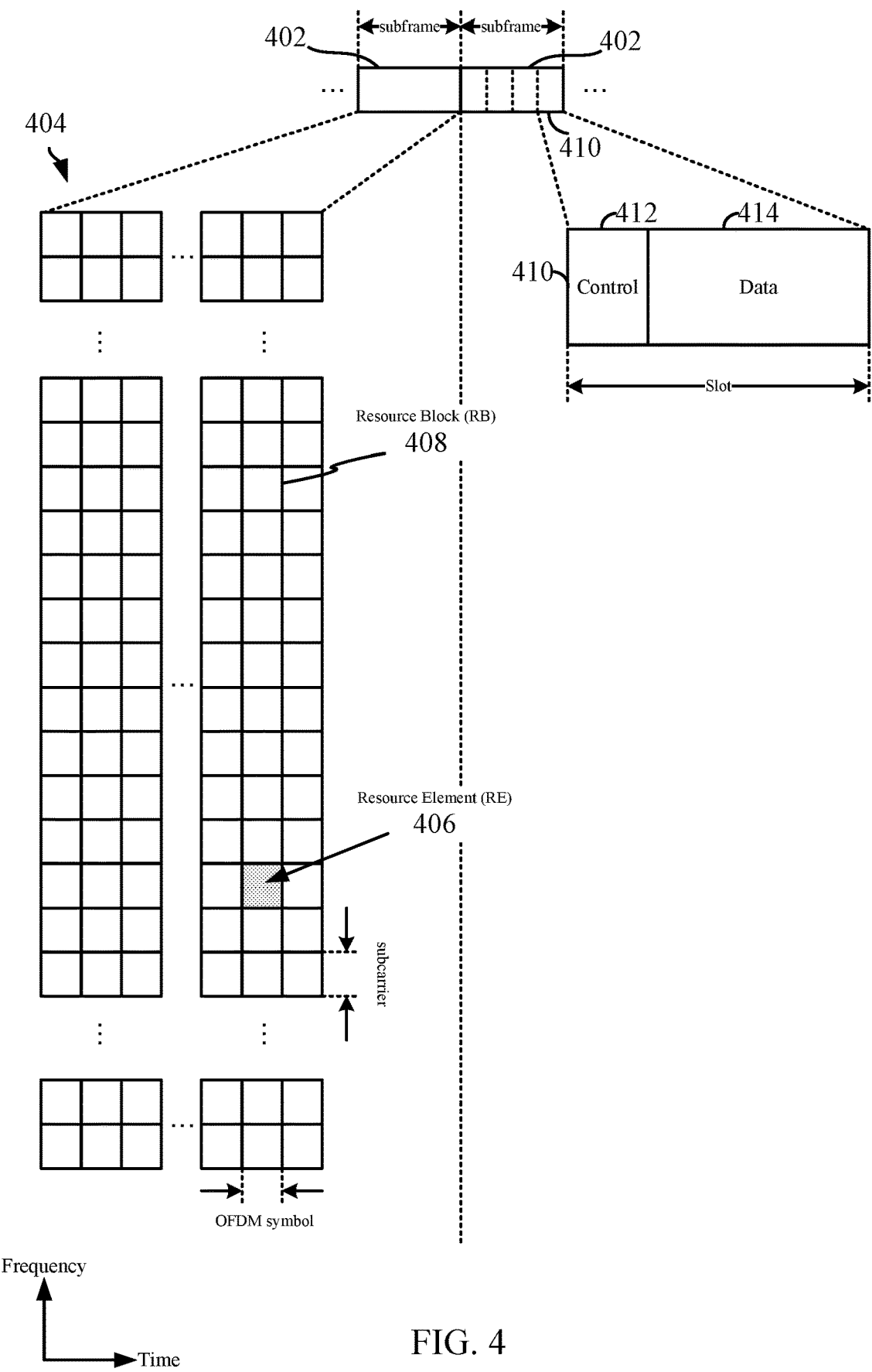
FIG. 4 is a schematic diagram illustrating organization of wireless resources in an air interface utilizing orthogonal frequency divisional multiplexing (OFDM).

Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols, and frequency is in the vertical direction with units of subcarriers or tones.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the scheduling entity may allocate one or more REs 406 (e.g., within a control region 412) to carry DL control information including one or more DL control channels that generally carry information originating from higher layers, such as a physical broadcast channel (PBCH), a physical downlink control channel (PDCCH), etc., to one or more scheduled entities. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In sidelink communications, resource allocation may be autonomous. Autonomous resource allocation refers to the UEs participating in sidelink communications determine time and frequency resources for data transmissions without scheduling by a network entity (e.g. base station). In some instances, a UE involved in sidelink communications may be power sensitive, such as when a UE operates on a limited power source (e.g., a battery). It may not be beneficial for a power-sensitive UE to continuously monitor sidelink transmissions to receive any relevant transmissions. According to one or more aspects of the present disclosure, UEs may be adapted to facilitate resource allocation for another UE in sidelink communications. In some implementations, such resource allocation for sidelink communications may facilitate power savings in one or more wireless communication devices. By way of example and not limitation, the various aspects of the present disclosure may find application in communications between a pedestrian UE (P-UE) and a vehicle UE (V-UE), where the P-UE is the power-sensitive device and the V-UE is not power sensitive.

Figure 5:
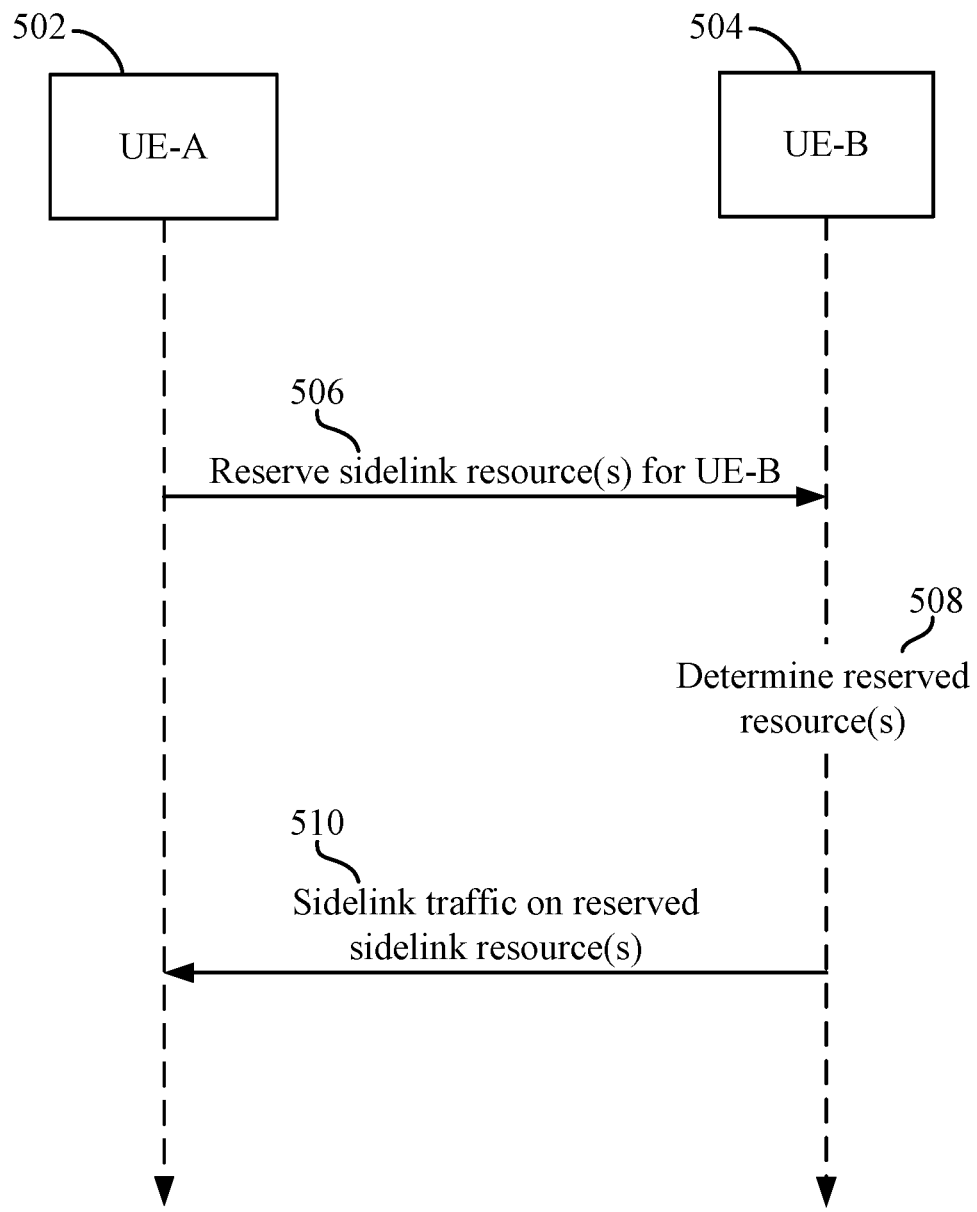
FIG. 5 is a flow diagram depicting communications between two UEs, including at least one power-sensitive UE according to one or more embodiments.

According to one or more aspects of the present disclosure, a first UE reserves sidelink resources for a second UE. For example, FIG. 5 is a flow diagram depicting communications between two UEs, a first UE (UE-A) 502, and a second UE (UE-B) 504. As indicated, UE-A 502 may reserve 506 sidelink resource(s) for UE-B 504. UE-B 504 can determine 508 which resource(s) is/are reserved, and may send sidelink traffic 510 on at least a portion of the reserved sidelink resource(s). In this example, the sidelink traffic 510 is shown as being sent by the UE-B 504 to the UE-A 502, but it should be understood that the UE-B 504 may use the resource reservation for sending a sidelink transmission to a different UE from UE-A 502.

Figure 6:
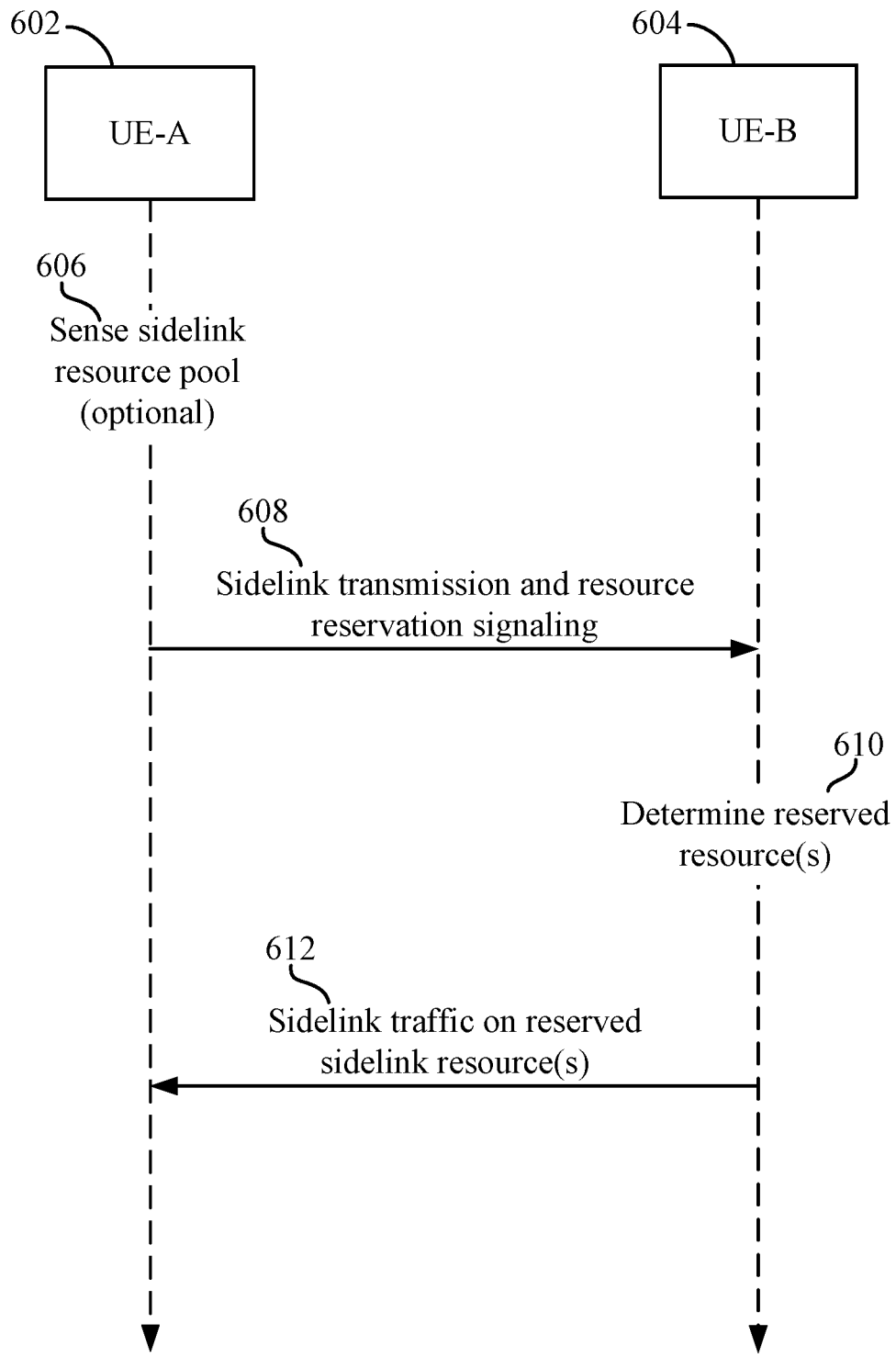
FIG. 6 is a flow diagram depicting communications between two UE-A and UE-B, where UE-A is a power-sensitive device and UE-B is not a power-sensitive device according to some embodiments.

In some embodiments of FIG. 5, the UE-A may be a power-sensitive device. FIG. 6 is a flow diagram depicting communications between UE-A 602 and UE-B 604, where UE-A 602 is a power-sensitive device and UE-B 604 is not a power-sensitive device. By way of example and not limitation, UE-A 602 may be a P-UE and UE-B 604 may be a V-UE, where the UEs are participating in vehicle-to-pedestrian (V2P) communications. This example is only illustrative, and should not be limiting to the present disclosure. It should be apparent that UE-A 602 and UE-B 604 may also be other types of UEs according to various examples.

As depicted, the UE-A 602 may optionally sense the sidelink resource pool 606 to determine resource usage. Based on such sensing of the sidelink resource pool, the UE-A 602 can learn whether time/frequency resources have been or will be occupied by other devices. The UE-A 602 can accordingly select a sidelink resource to be utilized by UE-B 604. In other implementations, the UE-A 602 may simply randomly select one or more random sidelink resources. With a sidelink resource(s) selected, the UE-A 602 can transmit 608 a sidelink data transmission together with signaling configured to reserve the one or more sidelink resources for a future sidelink transmission from UE-B 604. In at least one embodiment, the sidelink data transmission may include a pedestrian safety message (PSM).

The UE-B 604 can detect the resource reservation signaling to determine which resource(s) 610 are reserved, and can transmit sidelink traffic 612 in at least a portion of the resource(s) indicated by the reservation signaling. The resource reservation may reserve a single sidelink resource for the UE-B transmission in some implementations, or may reserve multiple sidelink resources for the UE-B 604 to select from for the sidelink traffic transmission 612.

By reserving one or more sidelink resources for UE-B 604 to utilize, the UE-A 602 knows where to receive any response message from UE-B 604. Accordingly, the UE-A 602 can power down one or more components outside of the reserved sidelink resource(s) to achieve power savings.

Figure 7:
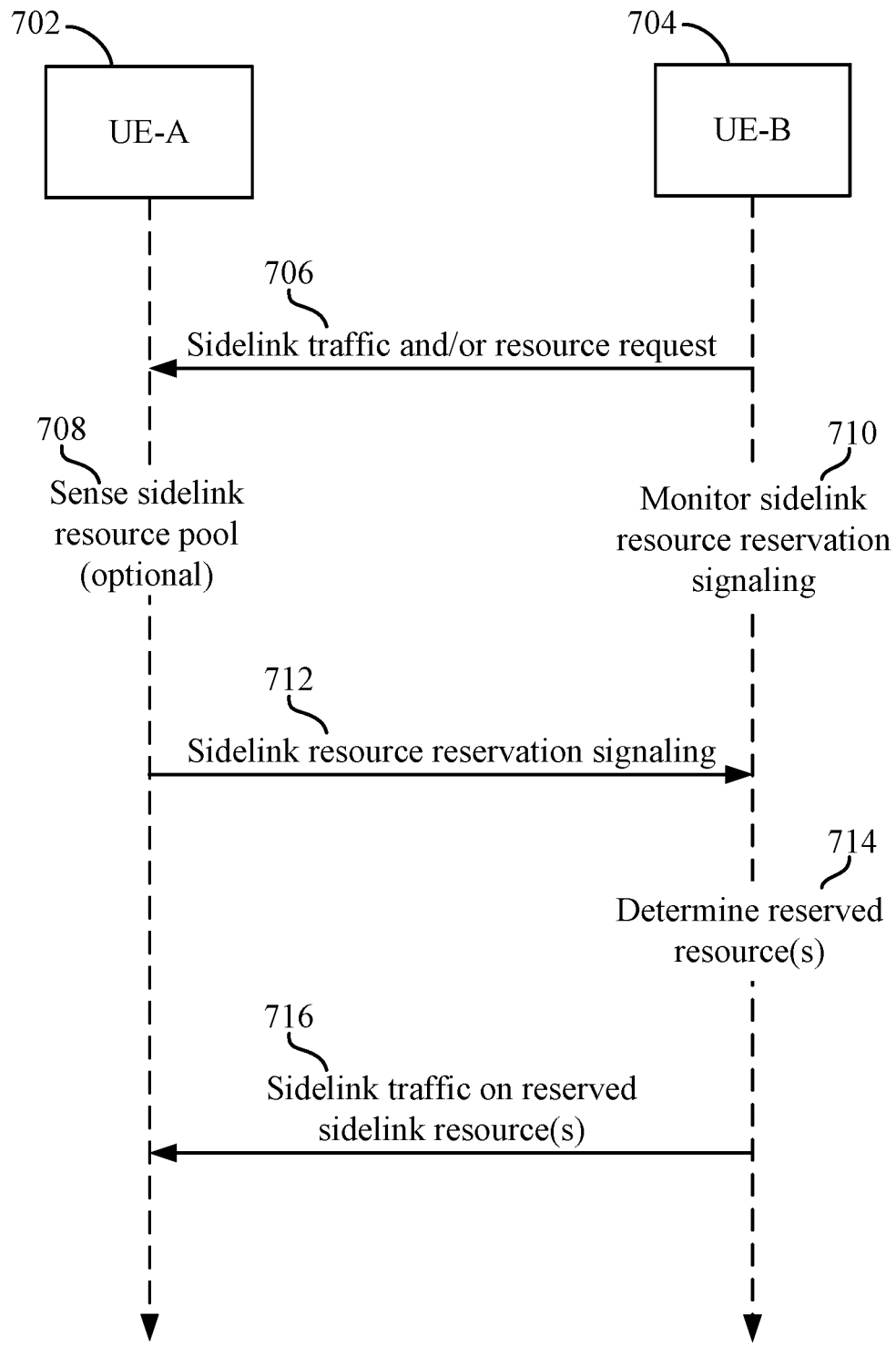
FIG. 7 is a flow diagram depicting communications between UE-A and UE-B, where UE-B is a power-sensitive device and UE-A is not a power-sensitive device according to some embodiments.

In some embodiments of FIG. 5, the UE-B may be a power-sensitive device. FIG. 7 is a flow diagram depicting communications between UE-A 702 and UE-B 704, where UE-B 704 is a power-sensitive device and UE-A 702 is not a power-sensitive device. By way of example and not limitation, UE-A 702 may be a V-UE and UE-B 704 may be a P-UE, where the UEs are participating in vehicle-to-pedestrian (V2P) communications. In other examples, UE-A 702 may be a smartphone and UE-B 704 may be a wearable device, such that the UE-B 704 may be more power sensitive than UE-A 702, even though both UEs may operate with a limited power source. These examples are only illustrative, and should not be limiting to the present disclosure. It should be apparent that UE-A 702 and UE-B 704 may also be other types of UEs according to various examples.

In some examples, the UE-B 704 may send a sidelink transmission and/or a sidelink resource request 706. For example, the UE-B 704 may send a data transmission and/or a scheduling request that is received by UE-A 702. In other embodiments, the UE-A 702 may simply reserve resources for other UEs (e.g., UE-B 704) in a periodical manner, without necessarily receiving any sidelink transmission and/or or sidelink resource request.

In response to receiving the sidelink transmission and/or resource request, the UE-A 702 may select one or more sidelink resources for the UE-B 704 to use in a future sidelink transmission. According to at least one example, such selection may include an optional sensing of the sidelink resource pool 708 by the UE-A 702 to identify sidelink resources that may be available in the future. In other examples, the UE-B 704 may simply select one or more sidelink resources randomly to be reserved.

After sending the sidelink traffic and/or resource request, the UE-B 704 can monitor 710 the sidelink resource reservation signaling. After selecting one or more sidelink resources, the UE-A 702 can send sidelink resource reservation signaling 712, which may be detected by the UE-B 704. After detecting the resource reservation signaling, the UE-B 704 determines 714 which sidelink resource(s) is/are reserved, and may send sidelink traffic 716 on at least a portion of the reserved sidelink resource(s).

In some examples, the resource reservation may include a single sidelink resource. In other examples, the resource reservation may include multiple reservations, including resources for multiple transmission occasions, e.g., the reserved resources are resources in multiple slots and/or multiple resource blocks (RBs)/subchannels. In examples where the UE-A 702 reserved multiple resources, the UE-B 704 may transmit in each of the multiple resources, such as by repeating the sidelink transmission or by sending different packets in each of the multiple reserved sidelink resources. In another example where the UE-A 702 reserved multiple resources, the UE-B 704 may transmit in one of the multiple resources, where the resource used for transmission is determined by some pre-defined rule, e.g., randomly select one of the reserved resource, or select a resource implied by an ID of UE-B, etc.

In some examples, the UE-B 704 may indicate its location in the sidelink transmission and/or sidelink resource request 706. Such a location indicator may be used by any receiving UE, such as UE-A 702, to determine whether or not to reserve sidelink resources for the UE-B 704. For example, the receiving UEs may utilize a range threshold, where any UE outside of the range threshold (e.g., more than a threshold distance from the UE-B 704) is configured to not reserve any sidelink resources for the UE-B 704.

In some examples, more than one UE may receive the sidelink traffic and/or resource request 706 from the UE-B 704. In embodiments that utilize the location indicator, more than one UE may receive the transmission 706 and may also be within the range threshold. As a result, more than one UE may reserve a sidelink resource for UE-B 704. In such examples, the UE-B 704 may select one of the reserved sidelink resources for use in transmitting. Alternatively, the UE-B 704 may transmit in more than one or all of the reserved resources, such as in a repetition manner.

By enabling the UE-A 702 to reserve sidelink resources for UE-B 704 in this example, the UE-B 704 can conserve power by avoiding the resource pool sensing that may be needed to select a resource to be reserved. In addition, the UE-B 704 can conserve power by avoiding the transmission of reservation signaling that may be necessary to reserve a sidelink resource. Instead, in this example, the UE-A 702 performs any needed sensing, and sends the resource reservation signaling.

In some implementations of FIG. 7, the resource reservation by UE-A 702 may occur in response to a certain type of transmission. For example, if the UE-A 702 is a V-UE and detects or receives a sidelink transmission by UE-B 704 implemented as a P-UE, the UE-A 702 (e.g., V-UE) may reserve resources for any P-UE transmissions. The reserved resource(s) may be used by the specific P-UE (e.g., UE-B 704) that sent the sidelink transmission, or may be used by other P-UEs. Additionally, the reserved sidelink resource(s) may be used for any communications by a P-UE, whether with a V-UE or other type of UE.

In some implementations of FIG. 7, certain types of UEs may always perform resource reservation for another type of UE. In a first example, a V-UE (e.g., UE-A 702) in any communication with a P-UE (e.g., UE-B 704) may reserve sidelink resources for the P-UE. In at least one implementation, when the V-UE transmits a safety message related to pedestrians (e.g., for a P-UE), the V-UE may also reserve a sidelink resource for P-UE transmissions. Accordingly, any P-UE that receives the V-UE safety message may transmit in the reserved sidelink resource(s).

In a second example, a UE with a larger capability in a sidelink UE pair/group may reserve resources for other UEs in the pair/group. For instance, a smartphone UE may have a larger capability compared with a smartwatch UE or other wearable UE. In such an example, the smartphone UE may reserve sidelink resources for the smartwatch UE.

In a third example, a sidelink UE group may select a UE in the group as the header. For instance, a sidelink UE group may elect a UE in the group to be the header. In such an example, the header UE may perform sensing and may reserve sidelink resources for the other UEs in the group.

In a forth example, an RSU (road side unit, a node communicating with UEs on sidelink) may reserve resources for V-UEs or P-UEs for sidelink transmissions. For instance, an RSU may monitor/sense the sidelink resources and reserve one or more resources based on sensing results.

Figure 8:
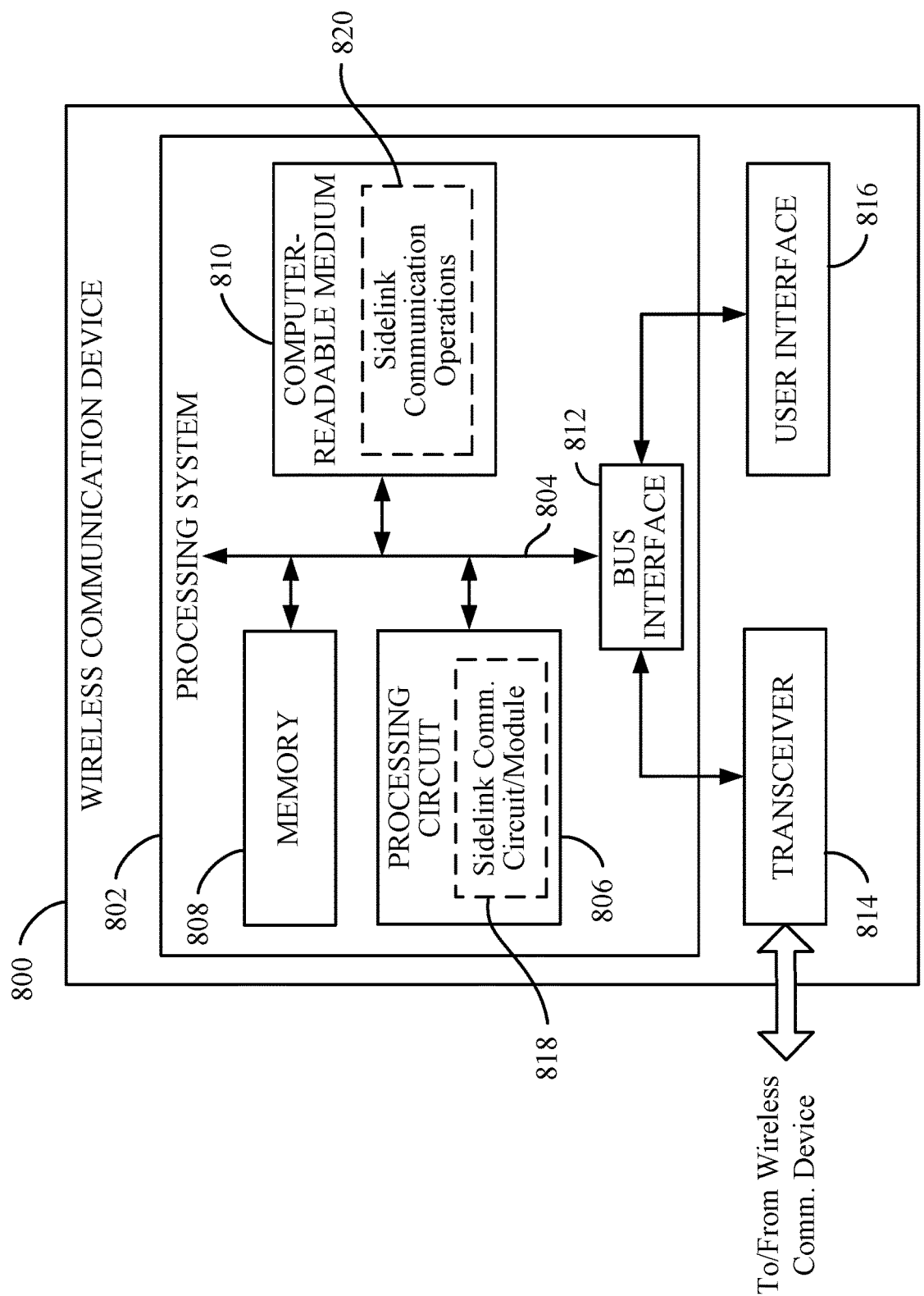
FIG. 8 is a block diagram illustrating select components of a wireless communication device employing a processing system according to at least one example of the present disclosure.

FIG. 8 is a block diagram illustrating select components of a wireless communication device 800 employing a processing system 802 according to at least one example of the present disclosure. The wireless communication device 800 may be a power-sensitive wireless communication device, as described herein.

In this example, the processing system 802 is implemented with a bus architecture, represented generally by the bus 804. The bus 804 may include any number of interconnecting buses and bridges depending on the specific application of the processing system 802 and the overall design constraints. The bus 804 communicatively couples together various circuits including one or more processors (represented generally by the processing circuit 806), a memory 808, and computer-readable media (represented generally by the storage medium 810). The bus 804 may also link various other circuits such as timing sources, peripherals, voltage regulators, and power management circuits, which are well known in the art, and therefore, will not be described any further.

A bus interface 812 provides an interface between the bus 804 and a transceiver 814. The transceiver 814 provides a means for communicating with various other apparatus over a transmission medium. For example, the transceiver 814 may include a receive chain to receive one or more wireless signals, and/or a transmit chain to transmit one or more wireless signals. Depending upon the nature of the apparatus, a user interface 816 (e.g., keypad, display, speaker, microphone, joystick) may also be provided.

The processing circuit 806 is responsible for managing the bus 804 and general processing, including the execution of programming stored on the computer-readable storage medium 810. The programming, when executed by the processing circuit 806, causes the processing system 802 to perform the various functions described below for any particular apparatus. The computer-readable storage medium 810 and the memory 808 may also be used for storing data that is manipulated by the processing circuit 806 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 806 is arranged to obtain, process and/or send data, control data access and storage, issue commands, and control other desired operations. The processing circuit 806 may include circuitry adapted to implement desired programming provided by appropriate media, and/or circuitry adapted to perform one or more functions described in this disclosure. For example, the processing circuit 806 may be implemented as one or more processors, one or more controllers, and/or other structure configured to execute executable programming and/or execute specific functions. Examples of the processing circuit 806 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 806 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 806 are for illustration and other suitable configurations within the scope of the present disclosure are also contemplated.

In some instances, the processing circuit 806 may include a sidelink communication circuit and/or module 818. The sidelink communication circuit/module 818 may generally include circuitry and/or programming (e.g., programming stored on the storage medium 810) adapted to perform one or more of the functions, processes or steps described herein with reference to FIGS. 1-7, 9, and 10. As used herein, reference to circuitry and/or programming may be generally referred to as logic (e.g., logic gates and/or data structure logic).

The storage medium 810 may represent one or more computer-readable devices for storing programming, such as processor executable code or instructions (e.g., software, firmware), electronic data, databases, or other digital information. The storage medium 810 may also be used for storing data that is manipulated by the processing circuit 806 when executing programming. The storage medium 810 may be any available non-transitory media that can be accessed by a general purpose or special purpose processor, including portable or fixed storage devices, optical storage devices, and various other mediums capable of storing, containing and/or carrying programming. By way of example and not limitation, the storage medium 810 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 810 may be coupled to the processing circuit 806 such that the processing circuit 806 can read information from, and write information to, the storage medium 810. That is, the storage medium 810 can be coupled to the processing circuit 806 so that the storage medium 810 is at least accessible by the processing circuit 806, including examples where the storage medium 810 is integral to the processing circuit 806 and/or examples where the storage medium 810 is separate from the processing circuit 806 (e.g., resident in the processing system 802, external to the processing system 802, distributed across multiple entities).

Programming stored by the storage medium 810, when executed by the processing circuit 806, can cause the processing circuit 806 to perform one or more of the various functions and/or process steps described herein. In at least some examples, the storage medium 810 may include sidelink communication operations 820. The various operations may generally be adapted to cause the processing circuit 806 to perform one or more of the functions, processes or steps described herein with reference to FIGS. 1-7, 9, and 10. Thus, according to one or more aspects of the present disclosure, the processing circuit 806 is adapted to perform (independently or in conjunction with the storage medium 810) any or all of the processes, functions, steps and/or routines for any or all of the wireless communication devices described herein (e.g., scheduled entity 106, 107, UE 222, 224, 226, 228, 230, 232, 234, 236, 238, 240, and 242, UE-A 502, 602, 702, UE-B 504, 604, 704). As used herein, the term "adapted" in relation to the processing circuit 806 may refer to the processing circuit 806 being one or more of configured, employed, implemented, and/or programmed (in conjunction with the storage medium 810) to perform a particular process, function, step and/or routine according to various features described herein.

Figure 9:
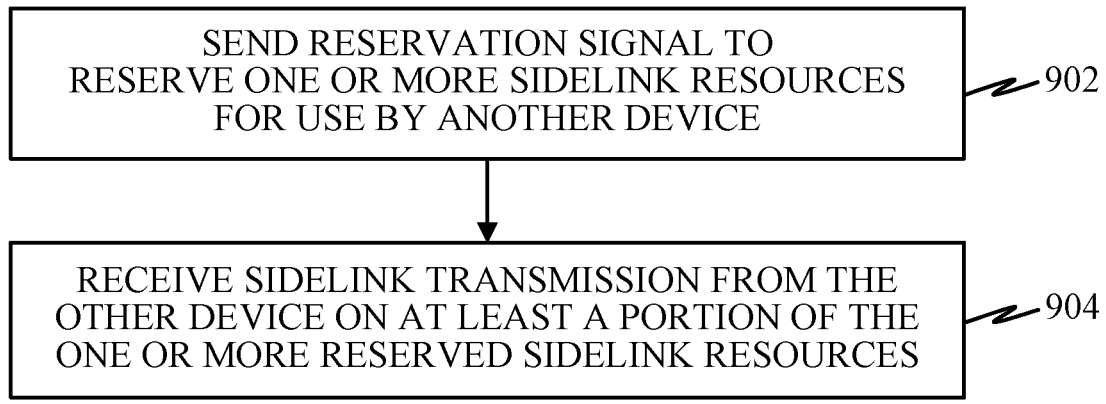
FIG. 9 is a flow diagram illustrating a wireless communication method (e.g., operational on or via a wireless communication device) according to some embodiments.

Referring to FIG. 9, a flow diagram is shown illustrating a wireless communication method (e.g., operational on or via a wireless communication device 800) according to some examples. As described below, some or all illustrated features may be omitted in a particular implementation within the scope of the present disclosure, and some illustrated features may not be required for implementation of all embodiments. In some examples, the method may be performed by the wireless communication device 800, as described above and illustrated in FIG. 8, by a processor or processing system, or by any suitable means for carrying out the described functions.

At 902, the wireless communication device may send a reservation signal to reserve one or more sidelink resources for use by another device. For example, the processing system 802 may include logic (e.g., sidelink communication circuit/module 818 and/or sidelink communication operations 820) to transmit via the transceiver 814 the reservation signaling to reserve the one or more sidelink resources for use by the other device.

In some implementations, such as the example described above with reference to FIG. 7, the wireless communication device may transmit the reservation signal in response to receiving an initial sidelink transmission from the other device. Such an initial sidelink transmission may include at least one of a sidelink resource request or sidelink traffic from the other device. In some implementations, the initial sidelink transmission may further include a location indicator configured to indicate the location of the other device. In instances where the initial sidelink transmission includes such a location indicator, the wireless communication device may transmit the reservation signal when the other device is within a range threshold (e.g., less than a threshold distance from the wireless communication device), and to avoid transmitting the reservation signal when the other device is outside of the range threshold (e.g., more than the threshold distance from the wireless communication device).

In some implementations, such as the example described above with reference to FIG. 6, the wireless communication device may transmit a pedestrian safety message (PSM) together with the reservation signal.

At 904, the wireless communication device may receive a sidelink transmission from the other device on at least a portion of the one or more reserved sidelink resources. For example, the processing system 802 may include logic (e.g., sidelink communication circuit/module 818 and/or sidelink communication operations 820) to receive a sidelink transmission via the transceiver 814 from the other device on at least a portion of the one or more reserved sidelink resources.

In some implementations, such as the example described above with reference to FIG. 6, the wireless communication device may monitor the one or more reserved sidelink resources for a sidelink transmission from the other device. In such implementations, the wireless communication device may power down one or more components of the transceiver (e.g., transceiver 814) during sidelink resources outside of the one or more reserved sidelink resources, and to power up the one or more components of the transceiver to receive transmissions during the one or more reserved sidelink resources.

In some implementations, the wireless communication device may sense a sidelink resource pool to determine resource usage prior to sending the reservation signal, and to select the one or more sidelink resources based on the sensing of the sidelink resource pool.

Figure 10:
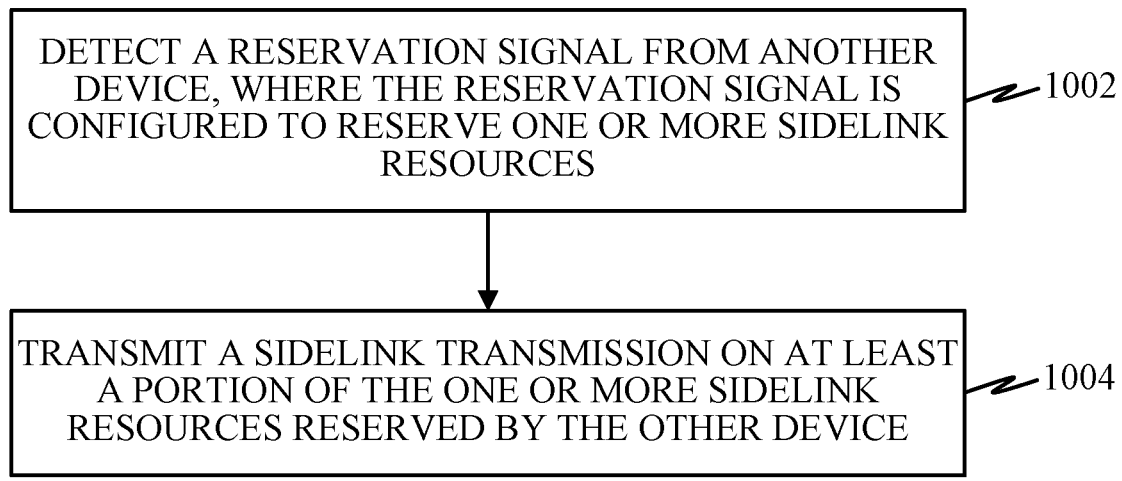
FIG. 10 is a flow diagram illustrating a wireless communication method (e.g., operational on or via a wireless communication device) according to some embodiments.

Referring to FIG. 10, a flow diagram is shown illustrating a wireless communication method (e.g., operational on or via a wireless communication device 800) according to some embodiments. As described below, some or all illustrated features may be omitted in a particular implementation within the scope of the present disclosure, and some illustrated features may not be required for implementation of all embodiments. In some examples, the method may be performed by the wireless communication device 800, as described above and illustrated in FIG. 8, by a processor or processing system, or by any suitable means for carrying out the described functions.

At 1002, a wireless communication device may detect a reservation signal from another device, where the reservation signal is configured to reserve one or more sidelink resources. For example, the processing system 802 may include logic (e.g., sidelink communication circuit/module 818 and/or sidelink communication operations 820) to detect via the transceiver 814 a reservation signal from another device, where the reservation signal is configured to reserve one or more sidelink resources. In some implementations, detecting the reservation signal may further include detecting a pedestrian safety message (PSM) sent in addition to the reservation signal.

In some implementations, such as the example described above with reference to FIG. 7, the wireless communication device may transmit via the transceiver (e.g., transceiver 814) an initial sidelink transmission prior to detecting the reservation signal from the other device. The initial sidelink transmission may include at least one of a data transmission and/or a sidelink resource reservation request. In some implementations, the initial sidelink transmission may further include a current location for the wireless communication device. After sending the initial sidelink transmission, the wireless communication device may monitor the resource reservation signaling via the transceiver for the reservation signal.

At 1004, the wireless communication device may transmit a sidelink transmission on at least a portion of the one or more sidelink resources reserved by the other device. For example, the processing system 802 may include logic (e.g., sidelink communication circuit/module 818 and/or sidelink communication operations 820) to transmit a sidelink transmission via the transceiver 814 on at least a portion of the one or more sidelink resources reserved by the other device.

In some implementations, the wireless communication device may transmit the sidelink transmission via the transceiver in each of the one or more sidelink resources reserved by the other device. For example, the wireless communication device may repeat the sidelink transmission to utilize each of the one or more sidelink resources reserved by the other device, or by sending different packets in each of the multiple reserved sidelink resources. In some implementations, the wireless communication device may transmit via the transceiver the sidelink transmission in one of the one or more sidelink resources reserved by the other device according to a pre-defined rule.

The following provides an overview of aspects of the present disclosure:

Aspect 1: A method of wireless communication, the method comprising: transmitting a reservation signal to reserve one or more sidelink resources for use by another device; and receiving a sidelink transmission from the other device on at least a portion of the one or more reserved sidelink resources.

Aspect 2: The method of aspect 1, wherein transmitting the reservation signal to reserve the one or more sidelink resources for use by the other device comprises: transmitting the reservation signal to reserve the one or more sidelink resources for use by the other device in response to receiving an initial sidelink transmission from the other device.

Aspect 3: The method of aspect 2, wherein the initial sidelink transmission from the other device comprises a location indicator associated with the other device.

Aspect 4: The method of aspect 3, wherein transmitting the reservation signal to reserve the one or more sidelink resources for use by the other device comprises transmitting the reservation signal to reserve the one or more sidelink resources for use by the other device when the location indicator indicates the other device is within a range threshold.

Aspect 5: The method of aspect, wherein receiving a sidelink transmission from the other device on at least a portion of the one or more reserved sidelink resources comprises monitoring the one or more reserved sidelink resources for a sidelink transmission from the other device.

Aspect 6: The method of aspect 5, further comprising: powering down one or more components of a transceiver during sidelink resources outside of the one or more reserved sidelink resources; and powering up the one or more components of the transceiver to receive transmissions during the one or more reserved sidelink resources.

Aspect 7: The method of any of aspects 1 through 6, further comprising: sensing a sidelink resource pool to determine resource usage prior to transmitting the reservation signal; and selecting the one or more sidelink resources based on the sensing of the sidelink resource pool.

Aspect 8: The method of any of aspects 1, 5, 6, or 7, wherein transmitting the reservation signal to reserve the one or more sidelink resources for use by the other device comprises: transmitting a pedestrian safety message together with the reservation signal.

Aspect 9: A wireless communication device comprising a transceiver and a processing circuit communicatively coupled together, the processing circuit configured to perform a method of any one of aspects 1 through 8.

Aspect 10: A method of wireless communication, the method comprising: detecting a reservation signal from another device, wherein the reservation signal is configured to reserve one or more sidelink resources; and transmitting a sidelink transmission on the one or more of the sidelink resources reserved by the other device.

Aspect 11: The method of aspect 10, further comprising: transmitting an initial sidelink transmission prior to detecting the reservation signal from the other device, the initial sidelink transmission comprising at least one of a data transmission or a sidelink resource reservation request; and monitoring the resource reservation signaling for the reservation signal after transmitting the initial sidelink transmission.

Aspect 12: The method of aspect 11, wherein the initial sidelink transmission further includes a location indicator configured to indicate a current location of the wireless communication device that transmits the initial sidelink transmission.

Aspect 13: The method of any of aspects 10 through 12, wherein transmitting the sidelink transmission on the one or more sidelink resources reserved by the other device comprises: transmitting the sidelink transmission in each of the one or more sidelink resources reserved by the other device.

Aspect 14: The method of aspect 13, wherein transmitting the sidelink transmission in each of the one or more sidelink resources reserved by the other device comprises: repeating the sidelink transmission to utilize each of the one or more sidelink resources reserved by the other device.

Aspect 15: The method of any of aspects 10 through 12, wherein transmitting the sidelink transmission on the one or more sidelink resources reserved by the other device comprises: transmitting the sidelink transmission in one of the one or more sidelink resources reserved by the other device according to a pre-defined rule.

Aspect 16: The method of aspect 1, wherein detecting the reservation signal from the other device further comprises: detecting a pedestrian safety message in addition to the reservation signal.

Aspect 17: A wireless communication device comprising a transceiver and a processing circuit communicatively coupled together, the processing circuit configured to perform a method of any one of aspects 10 through 16.

Aspect 18: An apparatus configured for wireless communication comprising at least one means for performing a method of any one of aspects 1 through 8 or 10 through 16.

Aspect 19: A non-transitory processor-readable storage medium storing processor-executable instructions for causing a processing circuit to perform a method of any one of aspects 1 through 8 or 10 through 16.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP or combinations of such systems. These systems may include candidates such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features and/or functions illustrated in FIGS. 1, 2, 3, 4, 5, 6, 7, 8, 9, and/or 10 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 3, 5, 6, 7, and/or 8 may be configured to perform or employ one or more of the methods, features, parameters, and/or steps described herein with reference to FIGS. 4, 5, 6, 7, 9, and/or 10. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
a transceiver; and
a processing circuit communicatively coupled to the transceiver, the processing circuit configured to:
transmit via the transceiver a reservation signal to reserve one or more sidelink resources for use by another device;
power down one or more components of the transceiver during sidelink resources outside of the one or more reserved sidelink resources based on the transmitted reservation signal;
power up the one or more components of the transceiver to receive transmissions during the one or more reserved sidelink resources based on the transmitted reservation signal; and
receive via the transceiver a sidelink transmission from the other device on at least a portion of the one or more reserved sidelink resources.

2. The wireless communication device of claim 1, wherein the processing circuit configured to receive via the transceiver the sidelink transmission from the other device on at least a portion of the one or more reserved sidelink resources comprises the processing circuit configured to:
monitor the one or more reserved sidelink resources for a sidelink transmission from the other device.

3. The wireless communication device of claim 1, wherein the processing circuit is further configured to:
sense a sidelink resource pool to determine resource usage prior to transmitting the reservation signal; and
select the one or more sidelink resources based on the sensing of the sidelink resource pool.

4. The wireless communication device of claim 1, wherein the processing circuit configured to transmit via the transceiver the reservation signal to reserve the one or more sidelink resources for use by the other device comprises the processing circuit configured to:
transmit via the transceiver a pedestrian safety message together with the reservation signal.

5. A method of wireless communication, comprising:
transmitting a reservation signal to reserve one or more sidelink resources for use by another device;
powering down one or more components of a transceiver during sidelink resources outside of the one or more reserved sidelink resources based on the transmitted reservation signal;
powering up the one or more components of the transceiver to receive transmissions during the one or more reserved sidelink resources based on the transmitted reservation signal; and
receiving a sidelink transmission from the other device on at least a portion of the one or more reserved sidelink resources.

6. The method of claim 5, wherein receiving a sidelink transmission from the other device on at least a portion of the one or more reserved sidelink resources comprises:
monitoring the one or more reserved sidelink resources for a sidelink transmission from the other device.

7. The method of claim 5, further comprising:
sensing a sidelink resource pool to determine resource usage prior to transmitting the reservation signal; and
selecting the one or more sidelink resources based on the sensing of the sidelink resource pool.

8. The method of claim 5, wherein transmitting the reservation signal to reserve the one or more sidelink resources for use by the other device comprises:
transmitting a pedestrian safety message together with the reservation signal.

* * * * *